(12) United States Patent
Maruyama

(10) Patent No.: US 11,804,763 B2
(45) Date of Patent: Oct. 31, 2023

(54) AXIAL GAP MOTOR

(71) Applicant: SEIKO EPSON CORPORATION, Tokyo (JP)

(72) Inventor: Hidenobu Maruyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 70 days.

(21) Appl. No.: 17/024,736

(22) Filed: Sep. 18, 2020

(65) Prior Publication Data

US 2021/0091647 A1 Mar. 25, 2021

(30) Foreign Application Priority Data

Sep. 20, 2019 (JP) ................................. 2019-171303

(51) Int. Cl.
| | |
|---|---|
| *H02K 21/24* | (2006.01) |
| *H02K 1/14* | (2006.01) |
| *H02K 1/27* | (2022.01) |
| *H02K 1/2793* | (2022.01) |

(52) U.S. Cl.
CPC ............. *H02K 21/24* (2013.01); *H02K 1/148* (2013.01); *H02K 1/2793* (2013.01)

(58) Field of Classification Search
CPC ...... H02K 1/148; H02K 1/2793; H02K 16/04; H02K 21/24
USPC ..................................................... 310/156.32
See application file for complete search history.

(56) References Cited

U.S. PATENT DOCUMENTS

| | | | |
|---|---|---|---|
| 4,466,529 A | 8/1984 | Thrandorf et al. | |
| 7,906,886 B2* | 3/2011 | Jang ...................... | H02K 1/148 310/268 |
| 8,917,007 B2* | 12/2014 | Matsuzaki ............ | F04D 13/064 310/216.007 |
| 2006/0028093 A1* | 2/2006 | Minagawa ............. | H02K 1/148 310/156.32 |
| 2006/0145562 A1 | 7/2006 | Nakayama | |
| 2009/0026873 A1 | 1/2009 | Matsuo et al. | |
| 2010/0141075 A1* | 6/2010 | Atarashi .............. | H02K 1/2796 310/156.35 |

(Continued)

FOREIGN PATENT DOCUMENTS

| | | | | |
|---|---|---|---|---|
| CN | 108370178 A | * | 8/2018 | ............. H02K 1/145 |
| EP | 1593190 B1 | * | 7/2008 | ............. H02K 1/148 |

(Continued)

OTHER PUBLICATIONS

Machine Translation of WO 2018167214 A1 (Year: 2018).*

*Primary Examiner* — Alex W Mok
(74) *Attorney, Agent, or Firm* — Gang Yu

(57) ABSTRACT

In an axial gap motor including a rotor and a stator placed apart in a direction of a rotation axis with respect to the rotor, the stator is formed by combination of a plurality of divided pieces containing cores and yokes in a circumferential direction of the rotation axis. A first end portion in the circumferential direction of a first divided piece as one of the divided pieces has a convex portion projecting in the circumferential direction and a second end portion of a second divided piece in contact with the first end portion has a concave portion fitted with the convex portion, and the convex portion is provided in a position apart from a side portion of the first divided piece along the circumferential direction in a radial direction.

7 Claims, 12 Drawing Sheets

(56) References Cited

U.S. PATENT DOCUMENTS

| | | |
|---|---|---|
| 2010/0231084 A1 | 9/2010 | Kinoshita |
| 2012/0263612 A1 | 10/2012 | Matsuzaki |
| 2013/0154397 A1* | 6/2013 | Sullivan ................ H02K 1/141 |
| | | 310/12.18 |
| 2018/0323663 A1* | 11/2018 | Ogawa ................. H02K 15/085 |

FOREIGN PATENT DOCUMENTS

| | | | |
|---|---|---|---|
| GB | 2511421 A * | 9/2014 | ............. H02K 1/20 |
| JP | S5532696 A | 3/1980 | |
| JP | H08205434 A | 8/1996 | |
| JP | 2006166679 A | 6/2006 | |
| JP | 2008113529 A | 5/2008 | |
| JP | 2008245504 A | 10/2008 | |
| JP | 2010220288 A | 9/2010 | |
| JP | 2011114993 A | 6/2011 | |
| JP | 2011166926 A | 8/2011 | |
| WO | WO-2017121941 A1 * | 7/2017 | ............. H02K 1/182 |
| WO | WO-2018167214 A1 * | 9/2018 | ............. H02K 15/02 |

\* cited by examiner

AXIAL GAP MOTOR

The present application is based on, and claims priority from JP Application Serial Number 2019-171303, filed Sep. 20, 2019, the disclosure of which is hereby incorporated by reference herein in its entirety.

BACKGROUND

1. Technical Field

The present disclosure relates to an axial gap motor.

2. Related Art

An axial gap motor has a gap between a stator and a rotor in which rotational magnetic flux is formed in a rotation axial direction of the motor. In the axial gap motor, it is proposed that the stator formed in an annular shape is manufactured as divided pieces (stator cores) divided so that each core contains a yoke and the plurality of stator cores are combined to form the stator.

In an axial gap motor of JP-A-2011-114993, when a plurality of stator cores are arranged, steps in a rotation axial direction are provided in yoke pieces forming yokes and assembled so that magnetic flux may easily pass through the yokes.

However, in the axial gap motor of JP-A-2011-114993, there is a problem that positioning relative to the stator cores is difficult and the positions of the divided stator cores in the radial direction are unstable.

SUMMARY

The present disclosure can be realized as the following embodiments or application examples. An axial gap motor according to the present disclosure includes a rotor rotating about a rotation axis, and a stator placed apart in a direction of the axis with respect to the rotor, in which a plurality of divided pieces containing cores and yokes are combined in a circumferential direction of the rotation axis, wherein the divided pieces include a first divided piece and a second divided piece in contact with the first divided piece, a first end portion of the first divided piece in the circumferential direction has a convex portion projecting in the circumferential direction and a second end portion of the second divided piece in the circumferential direction has a concave portion fitted with the convex portion, and the convex portion is provided in a position apart from a side portion of the first divided piece along the circumferential direction in a radial direction orthogonal to the rotation axis.

DESCRIPTION OF EXEMPLARY EMBODIMENTS

First Embodiment

Figure 1:
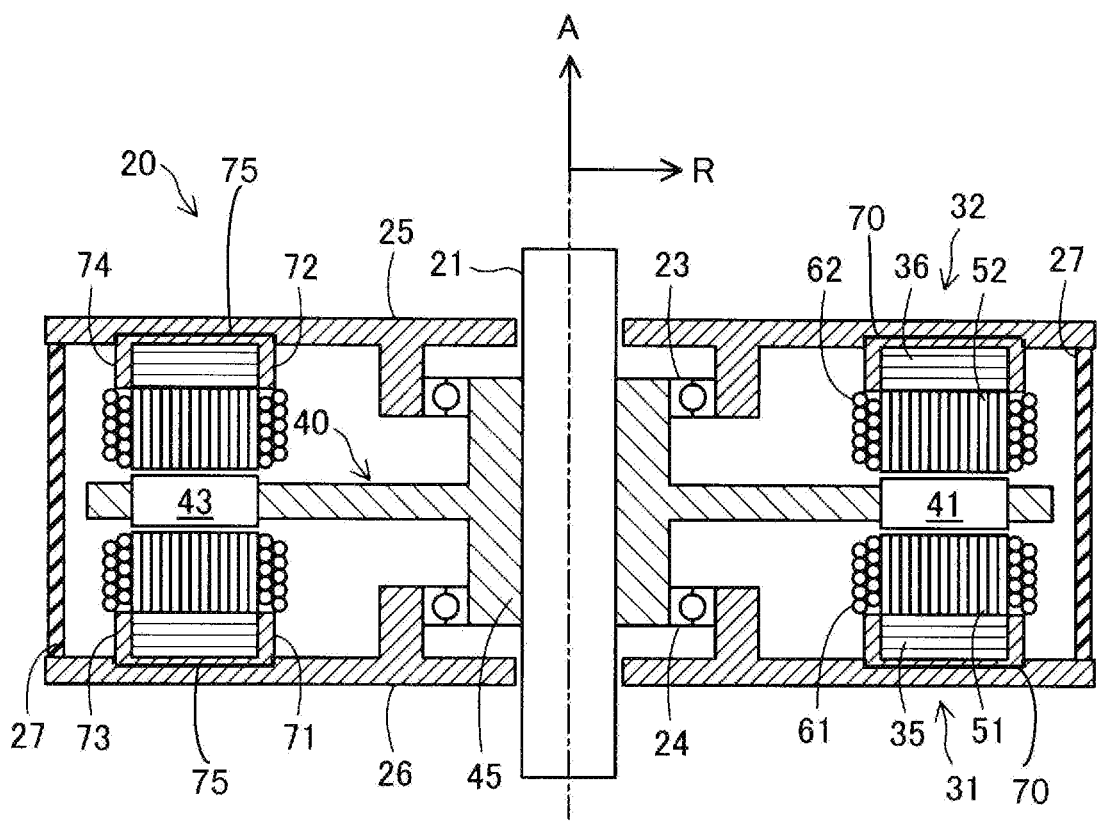
FIG. 1 is a schematic configuration diagram of an axial gap motor of an embodiment.

FIG. 1 is the schematic configuration diagram showing a schematic configuration of an axial gap motor 20 of the first embodiment in a sectional view. The axial gap motor 20 has the so-called double-stator structure including a rotor 40 at the center in an axial direction of a rotation shaft 21 and stators 31, 32 on both sides in an axial direction of the rotor 40. As shown in the drawing, the upward direction in the axial direction of the rotation shaft 21 is shown by sign A and the outward direction in the radial direction with respect to the rotation shaft 21 is shown by sign R. The directions shown by the signs A, R are the same in the other drawings. In addition to these directions, the circumferential direction of the rotor 40 and the stators 31, 32 may be shown by sign C. In the following description, the direction along the axial direction A may be referred to as "upper" and the opposite direction may be referred to as "lower".

The rotation shaft 21 is shown as a cylinder in FIG. 1, however, may be a hollow rotation shaft. In the axial gap motor 20, the thickness in the rotation axial direction A tends to be thinner and the dimension in the radial direction R tends to be larger. Accordingly, it is desirable to employ a configuration in which the diameter of the rotation shaft 21 is made larger as a hollow shaft and wires to the axial gap motor 20 pass through the shaft.

In the rotor 40 fixed substantially at the center in the axial direction of the rotation shaft 21, a plurality of, in the embodiment, twelve permanent magnets 41, 43 are placed uniformly in the circumferential direction near the end in the radial direction R. The number and arrangement of the permanent magnets 41, 43 are determined by the number of phases and the number of poles of the axial gap motor 20. In the center portion of the rotor 40, a fixing portion 45 to which the rotation shaft 21 is fixed is formed and the rotation shaft 21 is press-fitted into the fixing portion 45 and fixed. Obviously, the shaft and the portion may be coupled by a key and a key groove.

A first case 26 and a second case 25 are attached to the fixing portion 45 of the rotor 40 via bearings 23, 24. The first case 26 and the second case 25 are coupled by side cases 27 and form a motor case. Therefore, the rotation shaft 21 and the rotor 40 fixed via the fixing portion 45 thereto are rotatably held with respect to the motor case.

In the first case 26 and the second case 25, the stators 31, 32 are incorporated, respectively. The stators 31, 32 include cores and back yokes (hereinafter, simply referred to as "yokes"), which will be described later. In the stators 31, 32, pluralities of stator cores (hereinafter, simply referred to as "cores") 51, 52 are provided to face the permanent magnets 41, 43 of the rotor 40. For convenience of understanding, the schematic shape of the stator 31 is shown in the perspective view in FIG. 2. The axial gap motor 20 of the embodiment has a 3-phase 4-slot configuration, and the twelve cores 51 are provided in the stator 31. As will be described later, the single core 51 is contained in each divided piece 81, and thus, the stator 31 includes the twelve divided pieces 81. Note that the stator 32 has the same configuration.

Figure 2:
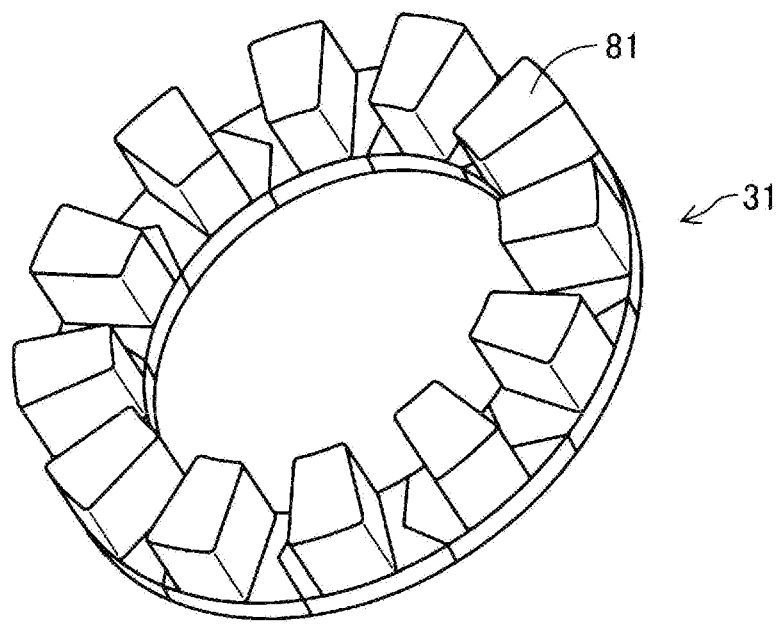
FIG. 2 is a perspective view exemplifying appearance shapes of cores and yokes of a stator used in the axial gap motor.
Figure 3:
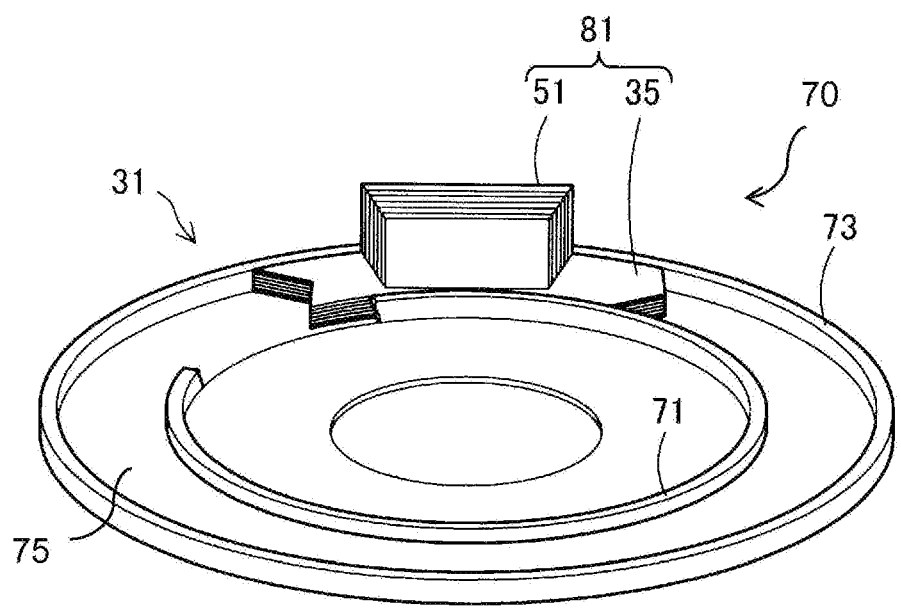
FIG. 3 is a perspective view showing a divided piece containing a single core and attachment to guides.
Figure 4:
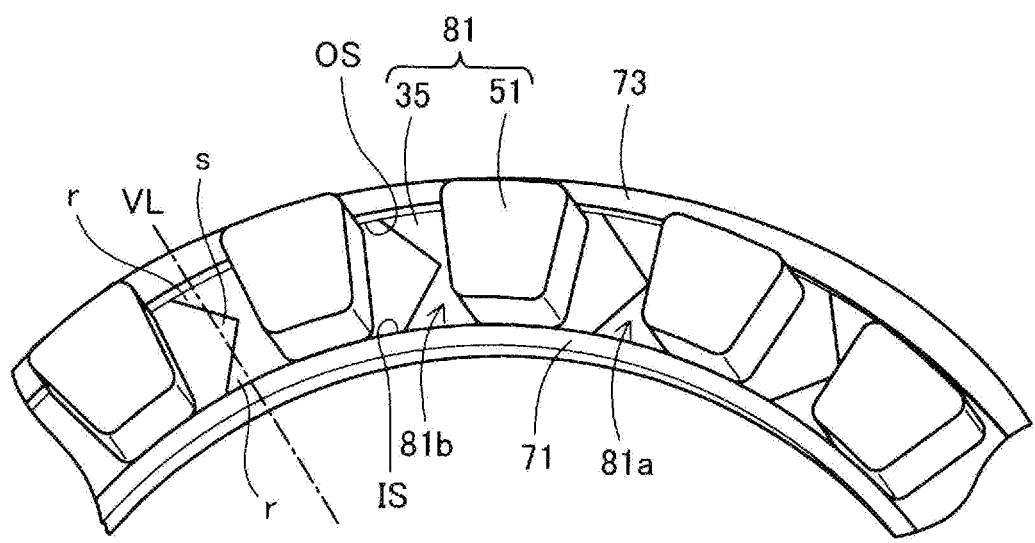
FIG. 4 is an explanatory diagram showing a relationship between the adjacent divided pieces.

As exemplified in FIG. 2, the stators 31, 32 are formed by combination of the pluralities of divided pieces 81 containing the cores and yokes. FIG. 3 is the perspective view showing an example of the divided piece 81 provided in the stator 31. The divided piece 81 includes a single yoke 35 and the core 51 provided thereon. In FIG. 3, only one divided piece 81 is shown, however, in practice, as shown in FIG. 4, the pluralities of divided pieces 81 are arranged in the circumferential direction of the stators 31, 32. In the first case 26, an inner circumference guide 71 and an outer circumference guide 73 as guide members that hold and guide parts 70 of the yokes 35 of the divided pieces 81 are provided. The divided pieces 81 are placed between the inner circumference guide 71 and the outer circumference guide 73 and fixed between the guides using an adhesive or the like. Note that, in FIG. 3, a part of the inner circumference guide 71 is cut and the yoke 35 as a plurality of stacked electrical steel sheets is shown. In the stator 32, an inner circumference guide 72 and an outer circumference guide 74 are similarly provided, and the divided pieces 81 are arranged along the circumferential direction between the guides 72, 74 like the stator 31.

As described above, the plurality of (twelve in the first embodiment) divided pieces 81 are arranged in the circumferential direction, and thereby, the stator 31 is formed. In other words, each stator 31 includes the twelve cores 51, the twelve yokes 35, and twelve coils 61 as winding coils wound around the outer circumferences of the cores 51. Both the cores 51 and the yokes 35 are formed by stacking of electrical steel sheets. In the yoke 35, the electrical steel sheets are stacked along the rotation axial direction A. On the other hand, in the core 51, the plurality of electrical steel sheets are stacked along the radial direction R. Insulating films are formed on the surfaces of the electrical steel sheets. In each electrical steel sheet, a recess projecting at the back side to about a half of the thickness is formed in the same location of the electrical steel sheet. After the electrical steel sheets are stacked, the respective electrical steel sheets are fixed by fitting and caulking of the recesses, i.e., "half-caulking". Note that the electrical steel sheets may be fixed by application of the adhesive before stacking or welding after stacking. The fixing of the electrical steel sheets is the same in stacking for cores and joining of the cores and the yokes, which will be described later. Further, the same applies to the other embodiments.

The other stator 32 includes the twelve cores 52, the twelve yokes 36, and twelve coils 62 as winding coils wound around the outer circumferences of the respective cores 52 like the stator 31. The two stators 31, 32 have plane-symmetrical structures with the rotor 40 in between, and the opposed surfaces of the twelve permanent magnets 41, 43 provided in the rotor 40 and the cores 51, cores 52 are separated with predetermined gaps.

End portion shapes of the yoke 35 in the divided piece 81 forming the stator 31 will be explained using FIG. 4. In the following description, regarding the circumferential direction, regardless of the clockwise direction or counter-clockwise direction, the direction away from the center of the divided piece 81 (the position in which the core 51 is located) is referred to as "outside in the circumferential direction" and the opposite side, i.e., the direction toward the center of the divided piece is referred to as "inside in the circumferential direction". Of ends of the divided piece 81 in the circumferential direction, the end in the clockwise direction is referred to as "anterior end in the circumferential direction" and the end in the counter-clockwise direction is referred to as "posterior end in the circumferential direction". The same applies to the other embodiments. The shape of the divided piece 81 may hold when the clockwise direction and the counter-clockwise direction are exchanged and which one of the ends is referred to as "anterior end in the circumferential direction" or "posterior end in the circumferential direction" is for convenience of explanation.

In the embodiment, in the divided piece 81, the single core 51 is provided substantially at the center of the yoke 35. Therefore, all of the adjacent divided pieces 81 have the same shape in the embodiment, however, for convenience of explanation, one divided piece 81 is referred to as "first divided piece" and the divided piece 81 adjacent thereto is referred to as "second divided piece". The first divided piece 81 and the second divided piece 81 contact in the end portions of the yokes 35. A first end portion 81a as one end portion in the circumferential direction of the yoke 35 contained in the first divided piece 81 has a shape complementary to a second end portion 81b of the adjacent second divided piece 81. As a result, when the first, second divided pieces 81 are arranged in the circumferential direction, the first end portion 81a of the first divided piece 81 is fitted in the second end portion 81b of the adjacent other second divided piece 81 and both of the divided pieces 81 are continuous in the yoke 35, and form an annular shape as a whole.

As shown in FIG. 4, the first end portion 81a and the second end portion 81b of the divided pieces 81 include convex portions s projecting to the outside in the circumferential direction. The convex portion s is provided in a position apart from side portions along the circumferential direction of the divided piece 81, i.e., a side portion OS at the outer circumference side and a side portion IS at the inner circumference side. The state in which the convex portion s is provided in the position apart from side portions along the circumferential direction of the divided piece 81 refers to a state in which, as shown in FIG. 4, with respect to a virtual line VL drawn along the radial direction R in a predetermined position at the inner side than the anterior end in the circumferential direction, when the end portion is divided into the convex portion s projecting to the outside in the circumferential direction and concave portions r located at the inner side than the convex portion s in the circumferential direction with respect to the virtual line VL, inner pieces and outer pieces are present on both sides of the convex portion s. That is, the concave portion r has the inner piece projecting in the circumferential direction in the position at the inner side than the convex portion s in the radial direction and the outer piece projecting in the circumferential direction in the position at the outer side than the convex portion s in the radial direction, and the part between the inner piece and the outer piece is recessed in the circumferential direction. This relationship is reversed in the second end portion 81b, and the convex portions s are present on both sides of the concave portion r in the second end portion 81b.

The above described relationship is summarized, and the first end portion 81a and the second end portion 81b have shapes for which totals of the numbers of convex portions s and the numbers of concave portions r with reference to the virtual line VL drawn along the radial direction R are respectively equal to or larger than three. The first end portion 81a as the anterior end in the circumferential direction and the second end portion 81b as the posterior end in the circumferential direction restrict the movement of the divided pieces 81 along the radial direction R in combination with the second end portion 81b as the posterior end in the circumferential direction and the first end portion 81a as the anterior end in the circumferential direction of the adjacent other divided pieces 81 along the circumferential direction.

Figure 5A:
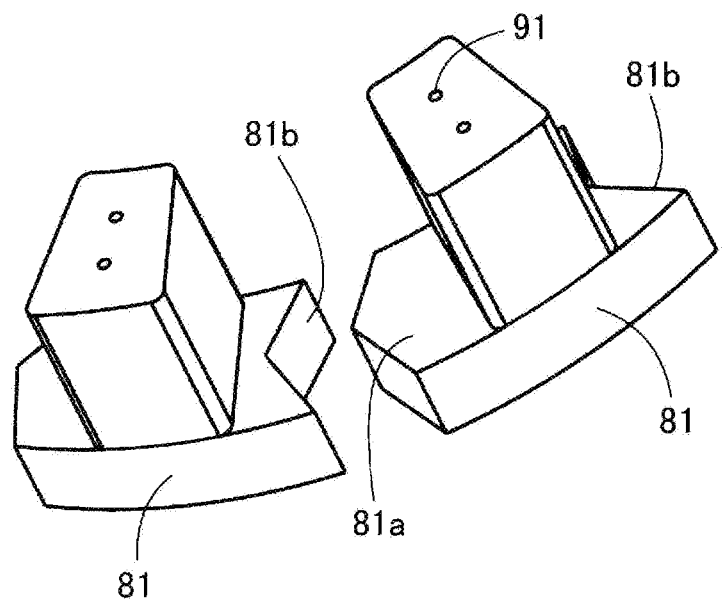
FIG. 5A is a perspective view showing shapes of adjacent two divided pieces of a first embodiment.
Figure 5B:
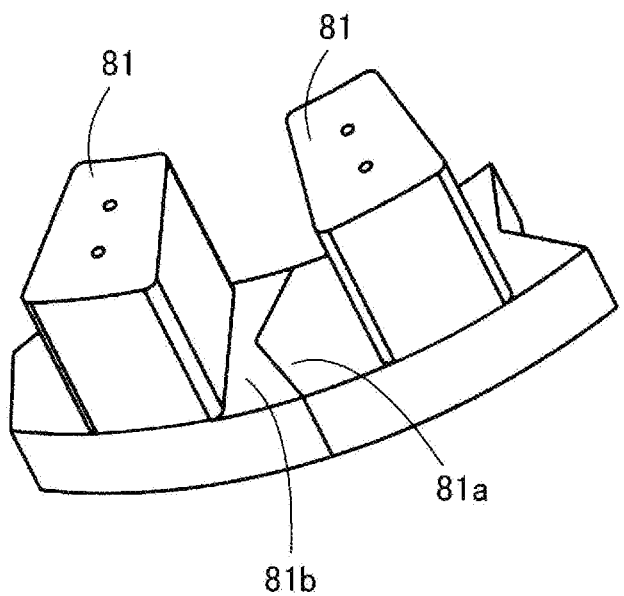
FIG. 5B is a perspective view showing a combined state of the adjacent two divided pieces of the first embodiment.

In the first embodiment, the plurality of divided pieces 81 forming the stator 31 have the same shape. Of the plurality of divided pieces 81, the adjacent first, second divided pieces 81 are shown in FIG. 5A. Further, a combined state of the first, second divided pieces 81 is shown in FIG. 5B. The sign 91 shows a knockout pin for fixing the core to the yoke (hereinafter, the same applies to the other embodiments). The first end portions 81a as the anterior ends in the circumferential direction of the first, second divided pieces 81 have one convex portions in triangular shapes in a plan view and the second end portions 81b as the posterior ends in the circumferential direction have one concave portions in triangular shapes in the plan view. In the first end portion 81a and the second end portion 81b, the convex portion and the concave portion are provided in the positions apart from the side portion at the outer circumference side and the side portion at the inner circumference side of the first divided piece 81. Accordingly, the first end portion 81a and the second end portion 81b having the complementary shapes are combined, and thereby, as shown in FIG. 5B, the adjacent two divided pieces 81 are closely joined, i.e., fitted. Even when a force inward along the radial direction R, i.e., in a direction toward the rotation shaft 21 is applied or a force outward along the radial direction R, i.e., in a direction away from the rotation shaft 21 is applied, a side surface present in the direction along the radial direction R of the convex portion or the concave portion of the first end portion 81a or the second end portion 81b of the single divided piece 81 contacts a side surface of the second end portion 81b or the first end portion 81a of the adjacent divided piece 81, and thereby, the divided pieces 81 are harder to be detached.

Therefore, the first end portion 81a and the second end portion 81b of the first divided piece 81 are combined with the second end portion 81b and the first end portion 81a of the second divided piece 81, and thereby, the movement of the first, second divided pieces 81 along the radial direction R may be restricted. As a result, the assembly of the stator 31 including the divided pieces 81 may be easier and the form of the stator 31 after the assembly may be easily held. In addition, it is not necessary to stack the annularly shaped common electrical steel sheets in the stator 31, but only necessary to form the electrical steel sheets having the sizes of the yokes 35 contained in the divided pieces 81 by pressing and stack the sheets, and thus, the electrical steel sheets may be efficiently used during manufacture. When a part of the stator 31 is broken, only the broken divided piece 81 may be repaired or replaced.

Second Embodiment

Figure 6A:
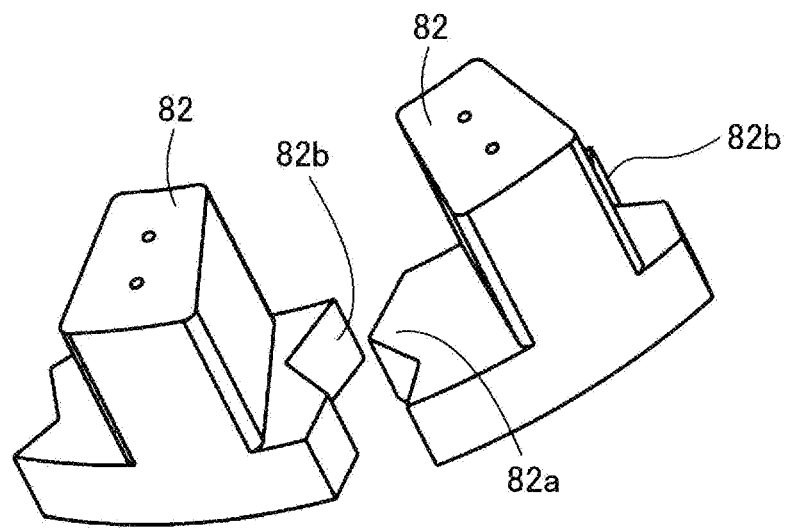
FIG. 6A is a perspective view showing shapes of adjacent two divided pieces of a second embodiment.
Figure 6B:
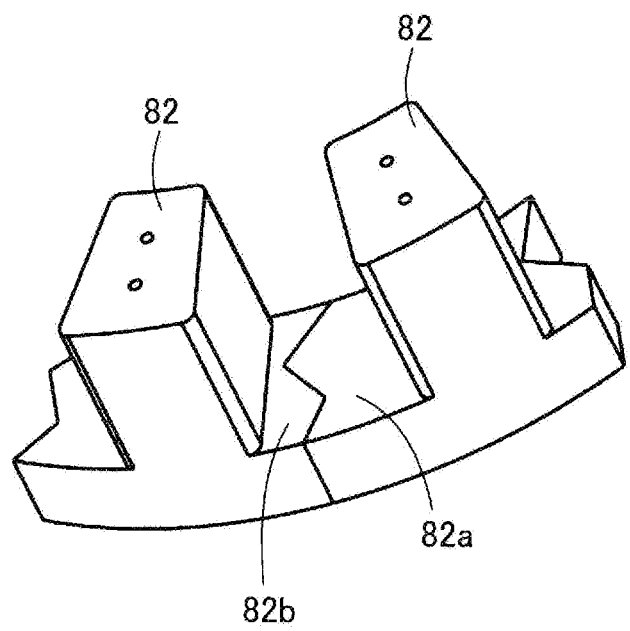
FIG. 6B is a perspective view showing a combined state of the adjacent two divided pieces of the second embodiment.

As below, the second to eleventh embodiments will be explained. The basic structures of the stators 31, 32 in these embodiments are the same and only the shapes and the combinations of the divided pieces will be explained. In the second embodiment, a plurality of divided pieces 82 forming the stator 31 have the same shape and the shapes of the adjacent first, second divided pieces 82 are shown in FIG. 6A. Further, a combined state of the first, second divided pieces 82 is shown in FIG. 6B. First end portions 82a as anterior ends in the circumferential direction of the first, second divided pieces 82 have one convex portions in triangular shapes in the plan view and one concave portions in triangular shapes in the plan view, and the second end portions 82b as posterior ends in the circumferential direction have one concave portions in triangular shapes in the plan view and one convex portions in triangular shapes in the plan view. In the first end portion 82a and the second end portion 82b, the convex portion and the concave portion are provided in the positions apart from the side portion at the outer circumference side and the side portion at the inner circumference side of the first divided piece 82. Accordingly, the first end portion 82a and the second end portion 82b having the complementary shapes are combined, and thereby, as shown in FIG. 6B, the adjacent two divided pieces 82 are closely joined. Even when a force inward along the radial direction R, i.e., in a direction toward the rotation shaft 21 is applied or a force outward along the radial direction R, i.e., in a direction away from the rotation shaft 21 is applied, side surfaces present in the direction along the radial direction R of the convex portion and the concave portion of the first end portion 82a or the second end portion 82b of the single divided piece 82 contact side surfaces of the second end portion 82b or the first end portion 82a of the adjacent divided piece 82, and thereby, the divided pieces 82 are harder to be detached.

Also, in the second embodiment, the first end portion 82a or the second end portion 82b of the first divided piece 82 is combined with the second end portion 82b or the first end portion 82a of the second divided piece 82, and thereby, the movement of the divided pieces 82 along the radial direction R may be restricted. Therefore, the assembly of the stator 31 may be easier and the stability of the form after the assembly may be improved. In addition, the same functions and effects may be exerted for efficient use and repair and replacement of the electrical steel sheets during manufacture.

Third Embodiment

Figure 7A:
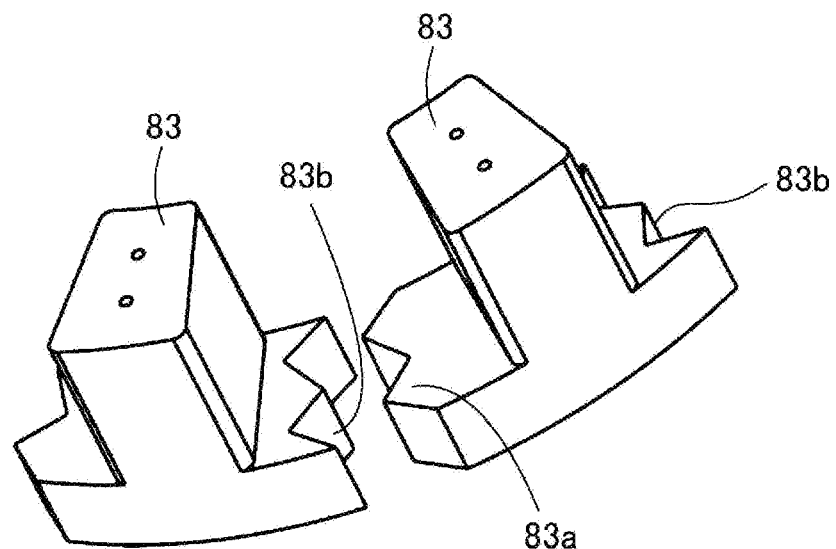
FIG. 7A is a perspective view showing shapes of adjacent two divided pieces of a third embodiment.
Figure 7B:
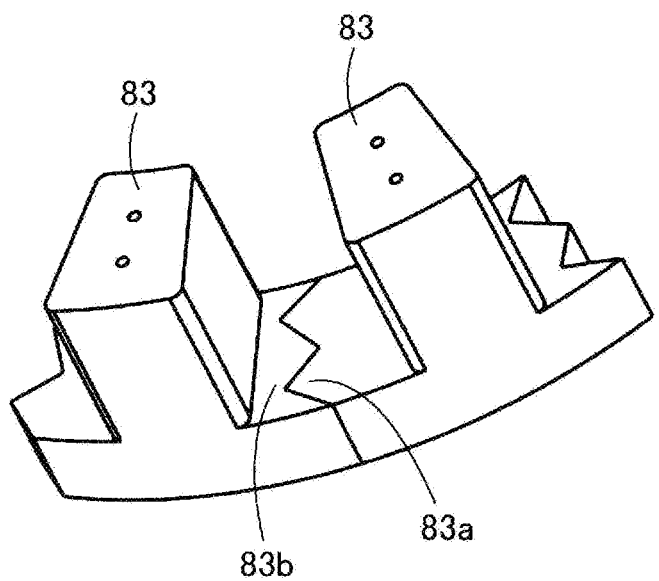
FIG. 7B is a perspective view showing a combined state of the adjacent two divided pieces of the third embodiment.

In the third embodiment, of a plurality of divided pieces 83 forming the stator 31, shapes of the adjacent first, second divided pieces 83 are shown in FIG. 7A. Further, a combined state of the first, second divided pieces 83 is shown in FIG. 7B. In the first, second divided pieces 83, first end portions 83a are provided at anterior ends in the circumferential direction and second end portions 83b are provided at posterior ends in the circumferential direction. The first end portion 83a has two convex portions in triangular shapes in the plan view, and the second end portion 83b has two convex portions in triangular shapes in the plan view. The first end portion 83a and the second end portion 83b have complementary shapes. In the first end portion 83a and the second end portion 83b, the convex portions and the concave portions are provided in the positions apart from the side portion at the outer circumference side and the side portion at the inner circumference side of the first divided piece 83. Accordingly, the first end portion 83a and the second end portion 83b having the complementary shapes are combined, and thereby, as shown in FIG. 7B, the adjacent two divided pieces 83 are closely joined. Even when a force inward along the radial direction R, i.e., in a direction toward the rotation shaft 21 is applied or a force outward along the radial direction R, i.e., in a direction away from the rotation shaft 21 is applied, side surfaces present in the direction along the radial direction R of the convex portions and the concave portions of the first end portion 83a or the second end portion 83b of the single divided piece 83 contact side surfaces of the second end portion 83b or the first end portion 83a of the adjacent divided piece 83, and thereby, the divided pieces 83 are harder to be detached.

Also, in the third embodiment, the first end portion 83a or the second end portion 83b of the first divided piece 83 is combined with the second end portion 83b or the first end portion 83a of the second divided piece 83, and thereby, the movement of the divided pieces 83 along the radial direction R may be restricted. Therefore, the assembly of the stator 31 may be easier and the stability of the form after the assembly may be improved. In addition, the same functions and effects may be exerted for efficient use and repair and replacement of the electrical steel sheets during manufacture.

Fourth Embodiment

Figure 8A:
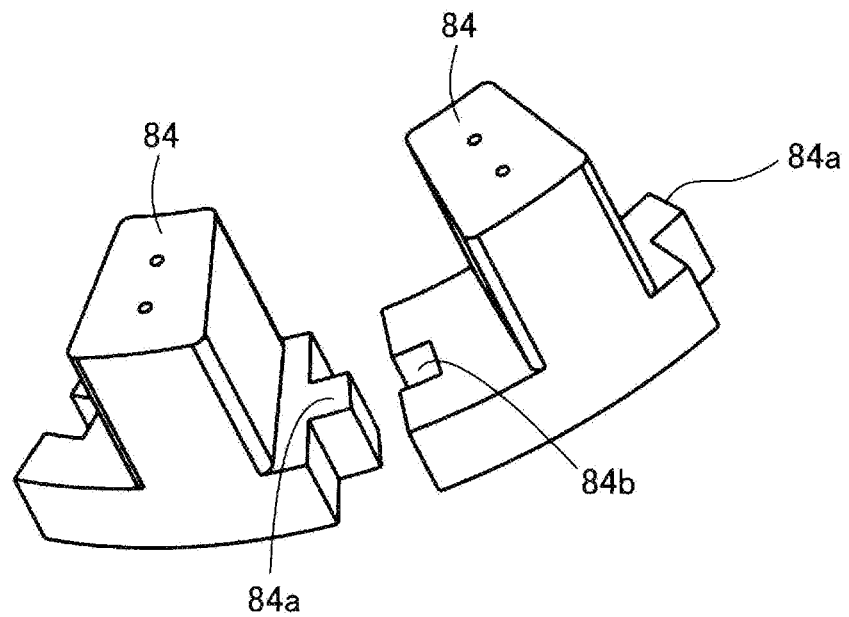
FIG. 8A is a perspective view showing shapes of adjacent two divided pieces of a fourth embodiment.
Figure 8B:
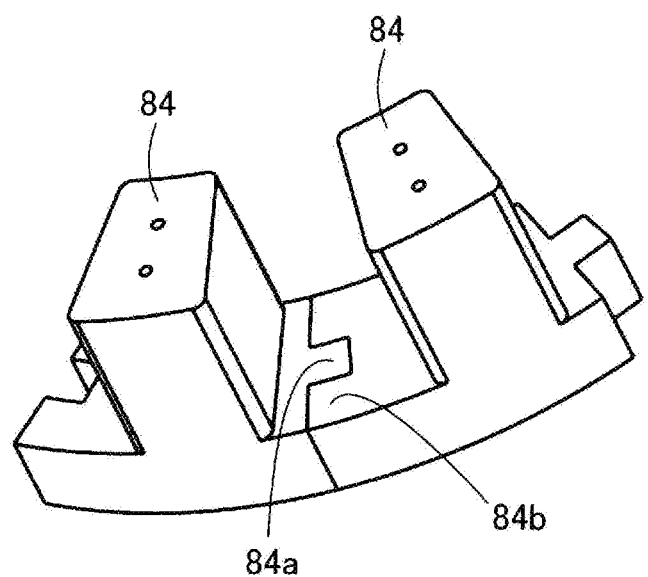
FIG. 8B is a perspective view showing a combined state of the adjacent two divided pieces of the fourth embodiment.

In the fourth embodiment, of a plurality of divided pieces 84 forming the stator 31, shapes of the adjacent first, second divided pieces 84 are shown in FIG. 8A. Further, a combined state of the first, second divided pieces 84 is shown in FIG. 8B. In the above described first to third embodiments, the shapes of the convex portions are the triangular shapes narrower toward the outside in the circumferential direction, however, in the embodiment, as shown in the drawings, convex portions have substantially rectangular shapes in the plan view. In the first, second divided pieces 84, first end portions 84a are provided at anterior ends in the circumferential direction and second end portions 84b are provided at posterior ends in the circumferential direction. The first end portion 84a has one convex portion in the rectangular shape, and the second end portion 84b has one concave portion in the rectangular shape. The first end portion 84a and the second end portion 84b have complementary shapes. In the first end portion 84a and the second end portion 84b, the convex portion and the concave portion are provided in the positions apart from the side portion at the outer circumference side and the side portion at the inner circumference side of the first divided piece 84. Accordingly, the first end portion 84a and the second end portion 84b having the complementary shapes are combined, and thereby, as shown in FIG. 8B, the adjacent two divided pieces 84 are closely joined. Even when a force inward or outward along the radial direction R is applied, side surfaces present in the direction along the radial direction R of the convex portion or the concave portion of the first end portion 84a or the second end portion 84b of the single divided piece 84 contact side surfaces of the second end portion 84b or the first end portion 84a of the adjacent divided piece 84, and thereby, the divided pieces 84 are harder to be detached.

Also, in this embodiment, the first end portion 84a and the second end portion 84b of the first divided piece 84 are combined with the second end portion 84b and the first end portion 84a of the second divided piece 84, and thereby, the movement of the divided pieces 84 along the radial direction R may be restricted. Therefore, the assembly of the stator 31 may be easier and the stability of the form after the assembly may be improved. In addition, the same functions and effects may be exerted for efficient use and repair and replacement of the electrical steel sheets during manufacture.

Fifth Embodiment

Figure 9A:
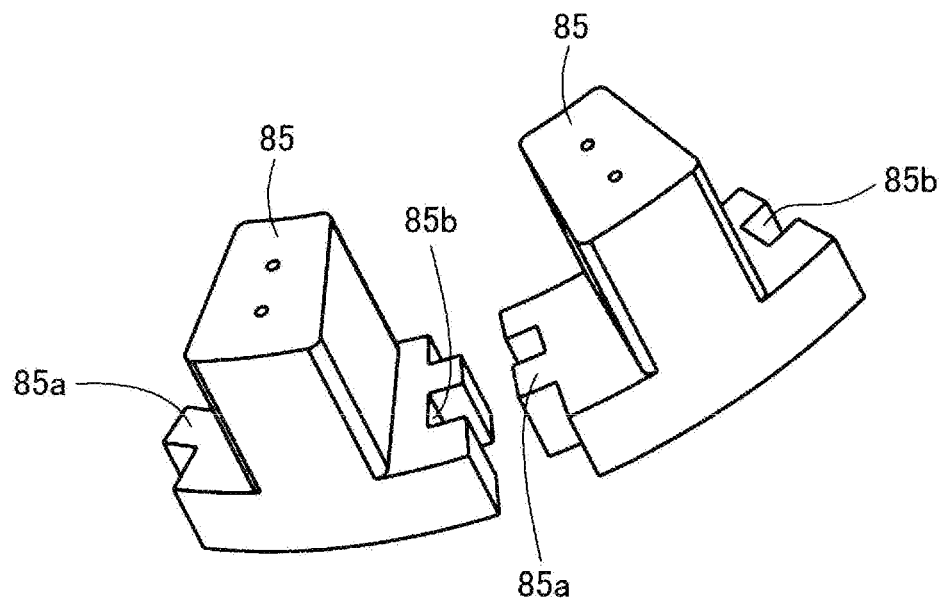
FIG. 9A is a perspective view showing shapes of adjacent two divided pieces of a fifth embodiment.
Figure 9B:
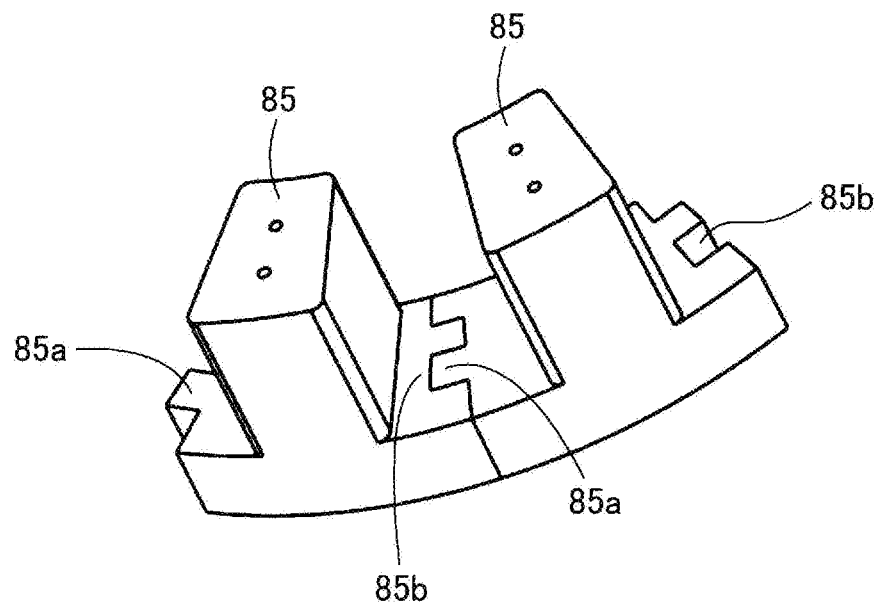
FIG. 9B is a perspective view showing a combined state of the adjacent two divided pieces of the fifth embodiment.

In the fifth embodiment, of a plurality of divided pieces 85 forming the stator 31, shapes of the adjacent first, second divided pieces 85 are shown in FIG. 9A. Further, a combined state of the first, second divided pieces 85 is shown in FIG. 9B. In the embodiment, in the first, second divided pieces 85, first end portions 85a are provided at anterior ends in the circumferential direction and second end portions 85b are provided at posterior ends in the circumferential direction. The first end portion 85a has two convex portions in rectangular shapes, and the second end portion 85b has two concave portions in rectangular shapes. The first end portion 85a and the second end portion 85b have complementary shapes. In the first end portion 85a and the second end portion 85b, the convex portions and the concave portions are provided in the positions apart from the side portion at the outer circumference side and the side portion at the inner circumference side of the first divided piece 85. Accordingly, the first end portion 85a and the second end portion 85b having the complementary shapes are combined, and thereby, as shown in FIG. 9B, the adjacent two divided pieces 85 are closely joined. Even when a force inward or outward along the radial direction R is applied, side surfaces present in the direction along the radial direction R of the convex portions or the concave portions of the first end portion 85a or the second end portion 85b of the single divided piece 85 contact side surfaces of the second end portion 85b or the first end portion 85a of the adjacent divided piece 85, and thereby, the divided pieces 85 are harder to be detached.

Also, in this embodiment, the first end portion 85a and the second end portion 85b of the first divided piece 85 are combined with the second end portion 85b and the first end portion 85a of the second divided piece 85, and thereby, the movement of the divided pieces 85 along the radial direction R may be restricted. Therefore, the assembly of the stator 31 may be easier and the stability of the form after the assembly may be improved. In addition, the same functions and effects may be exerted for efficient use and repair and replacement of the electrical steel sheets during manufacture.

Sixth Embodiment

Figure 10A:
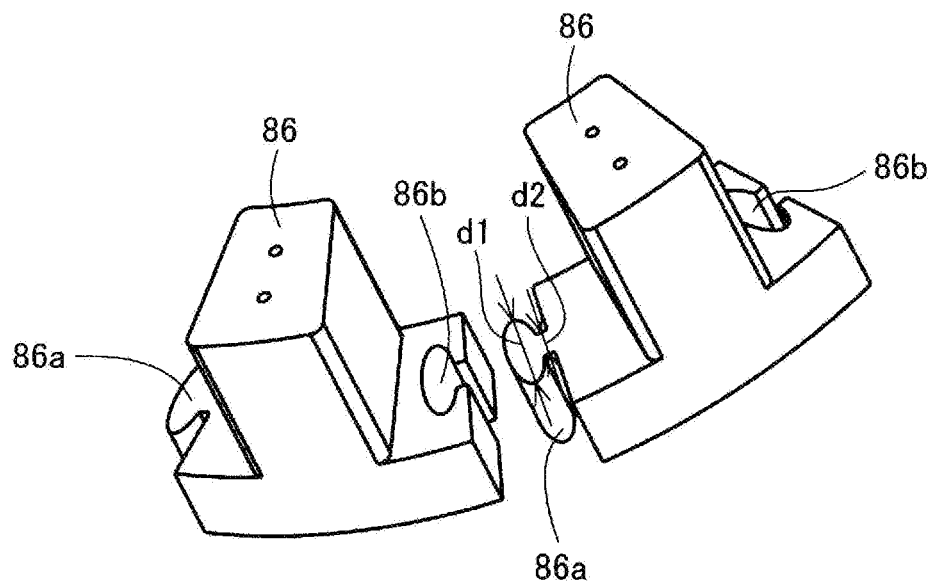
FIG. 10A is a perspective view showing shapes of adjacent two divided pieces of a sixth embodiment.
Figure 10B:
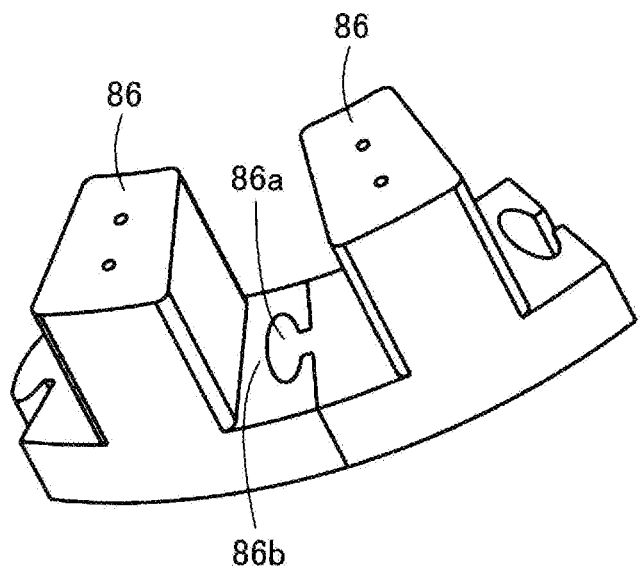
FIG. 10B is a perspective view showing a combined state of the adjacent two divided pieces of the sixth embodiment.

In the sixth embodiment, of a plurality of divided pieces 86 forming the stator 31, shapes of the adjacent first, second divided pieces 86 are shown in FIG. 10A. Further, a combined state of the first, second divided pieces 86 is shown in FIG. 10B. In the embodiment, in the first, second divided pieces 86, first end portions 86a are provided at anterior ends in the circumferential direction and second end portions 86b are provided at posterior ends in the circumferential direction. The first end portion 86a has one convex portion projecting in an oval shape in the plan view, and the second end portion 86b has one concave portion in an oval shape in the plan view. As shown in FIG. 10A, the convex portion has a length d1 along the radial direction R in a first position at the outside in the circumferential direction larger than a length d2 along the radial direction R in a second position at the inner side in the circumferential direction than the first position. The first end portion 86a and the second end portion 86b have complementary shapes. In the first end portion 86a and the second end portion 86b, the convex portion and the concave portion in the oval shapes are provided in the positions apart from the side portion at the outer circumference side and the side portion at the inner circumference side of the first divided piece 86.

The first end portion 86a and the second end portion 86b having the complementary shapes are combined, and thereby, as shown in FIG. 10B, the adjacent two divided pieces 86 are closely joined. Even when a force inward or outward along the radial direction R is applied, side surfaces present in the direction along the radial direction R of the convex portion or the concave portion of the first end portion 86a or the second end portion 86b of the single divided piece 86 contact side surfaces of the second end portion 86b or the first end portion 86a of the adjacent divided piece 86, and thereby, the divided pieces 86 are not detached. Further, the convex portion and the concave portion have the shapes undetachably fitted and, even when a force in the circumferential direction is applied, the portions are not detached.

Also, in this embodiment, the first end portion 86a and the second end portion 86b of the first divided piece 86 are combined with the second end portion 86b and the first end portion 86a of the second divided piece 86, and thereby, the movement of the divided pieces 86 along the radial direction R may be restricted. Therefore, the assembly of the stator 31 may be easier and the stability of the form after the assembly may be improved. In addition, the same functions and effects may be exerted for efficient use and repair and replacement of the electrical steel sheets during manufacture.

Seventh Embodiment

Figure 11A:
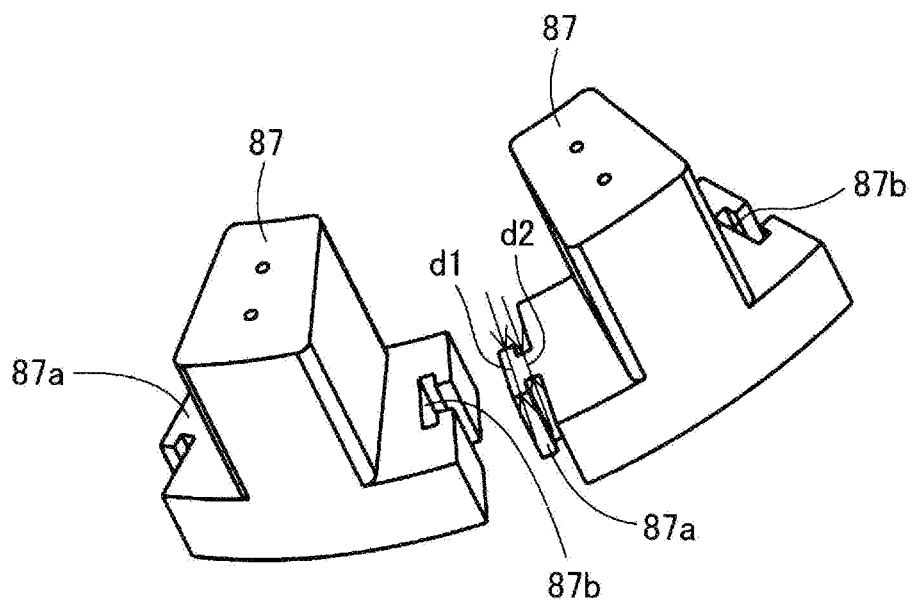
FIG. 11A is a perspective view showing shapes of adjacent two divided pieces of a seventh embodiment.
Figure 11B:
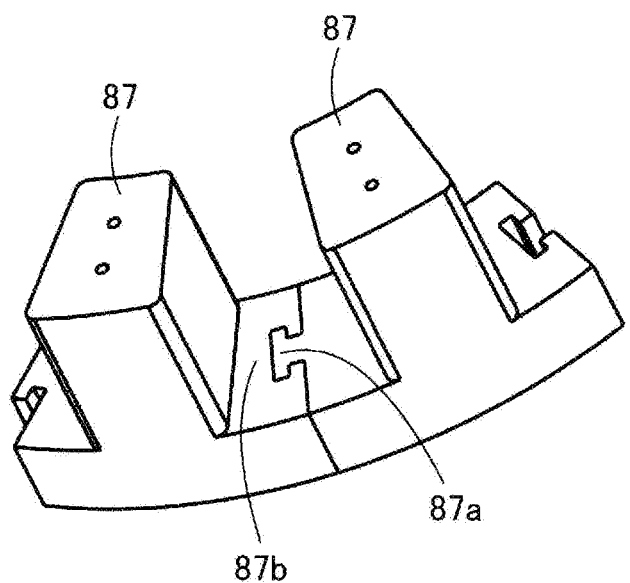
FIG. 11B is a perspective view showing a combined state of the adjacent two divided pieces of the seventh embodiment.

In the seventh embodiment, of a plurality of divided pieces 87 forming the stator 31, shapes of the adjacent first, second divided pieces 87 are shown in FIG. 11A. Further, a combined state of the first, second divided pieces 87 is shown in FIG. 11B. The embodiment has the same form except that the shapes of the convex portions and the corresponding concave portions are different from those of the sixth embodiment. In the embodiment, convex portions provided in first end portions 87a at anterior ends in the circumferential direction of the first, second divided pieces 87 and concave portions provided in second end portions 87b at posterior ends in the circumferential direction of the first, second divided pieces 87 have substantially rectangular shapes in the plan view as shown in the drawings. The convex portion and the concave portion have lengths d1 along the radial direction R in a first position at the outside in the circumferential direction larger than lengths d2 along the radial direction R in a second position at the inner side in the circumferential direction than the first position. The first end portion 87a and the second end portion 87b have complementary shapes as is the cases with the other embodiments.

The first end portion 87a and the second end portion 87b having the complementary shapes are combined, and thereby, the divided pieces 87 are not detached even when a force is applied in any direction as is the case with the sixth embodiment. Therefore, the assembly of the stator 31 may be easier and the stability of the form after the assembly may be improved. In addition, the same functions and effects may be exerted for efficient use and repair and replacement of the electrical steel sheets during manufacture.

Eighth Embodiment

Figure 12A:
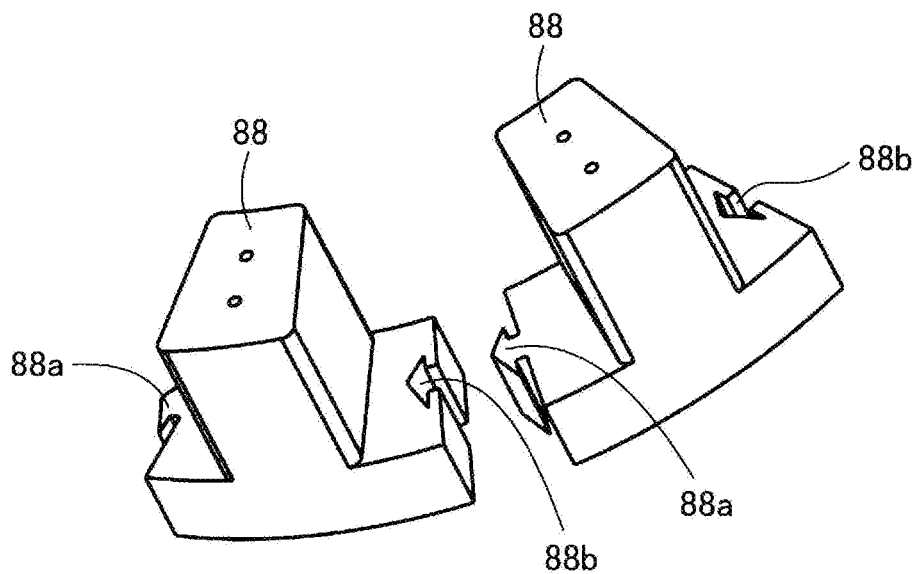
FIG. 12A is a perspective view showing shapes of adjacent two divided pieces of an eighth embodiment.
Figure 12B:
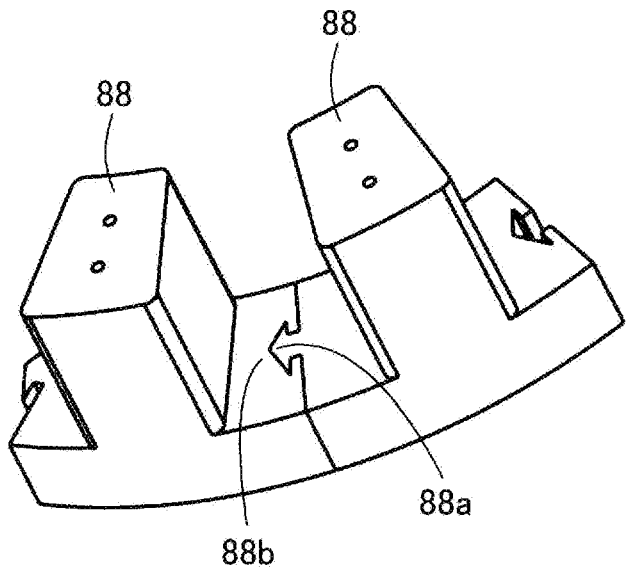
FIG. 12B is a perspective view showing a combined state of the adjacent two divided pieces of the eighth embodiment.

In the eighth embodiment, of a plurality of divided pieces 88 forming the stator 31, shapes of the adjacent first, second divided pieces 88 are shown in FIG. 12A. Further, a combined state of the first, second divided pieces 88 is shown in FIG. 12B. The embodiment has the same form except that the shapes of the convex portions and the corresponding concave portions are different from those of the sixth, seventh embodiments. In the embodiment, convex portions provided in first end portions 88a at anterior ends in the circumferential direction of the first, second divided pieces 88 and concave portions provided in second end portions 88b at posterior ends in the circumferential direction of the first, second divided pieces 88 have substantially arrowhead shapes (hook shapes) in the plan view as shown in the drawings. In the convex portions and the concave portions, the first end portion 88a and the second end portion 88b have complementary shapes as is the cases with the sixth, seven embodiments. The portions are combined, and thereby, the divided pieces 88 are not detached even when a force is applied in any direction as is the cases with the sixth, seventh embodiments. Therefore, the assembly of the stator 31 may be easier and the stability of the form after the assembly may be improved. In addition, the same functions and effects may be exerted for efficient use and repair and replacement of the electrical steel sheets during manufacture.

Ninth Embodiment

Figure 13:
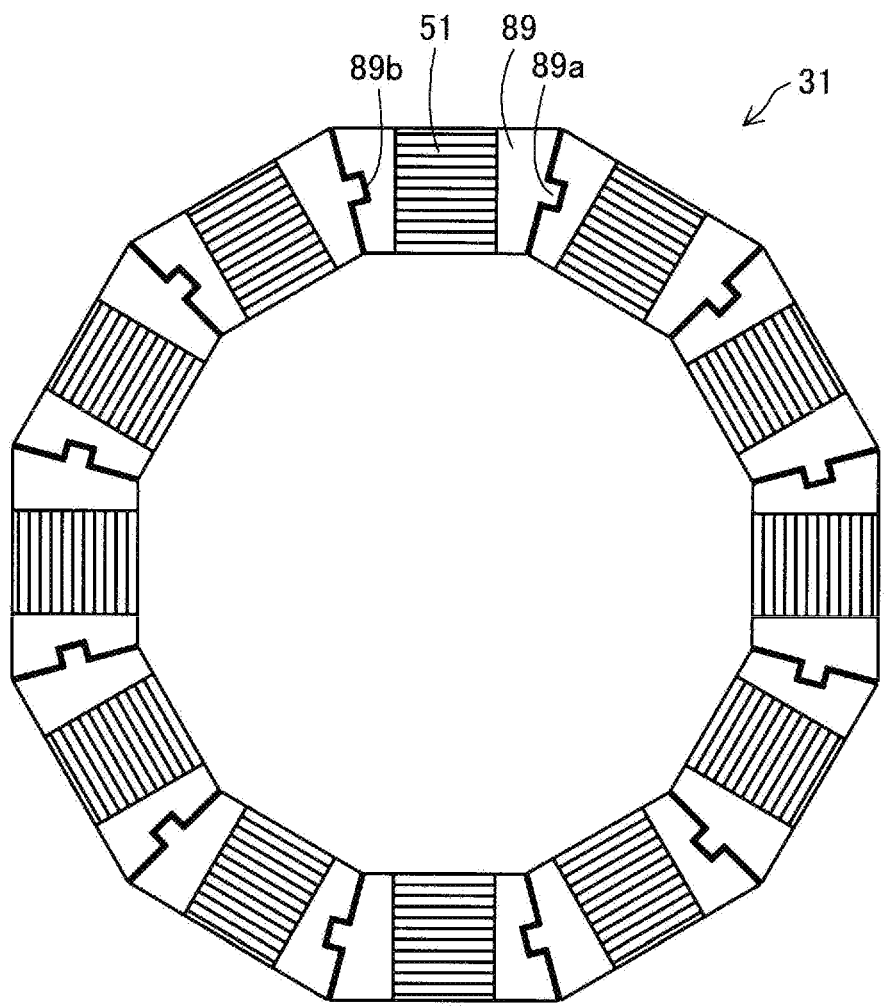
FIG. 13 is a top view of a stator in which twelve divided pieces are combined of a ninth embodiment.

FIG. 13 shows the stator 31 used for the axial gap motor 20 of the ninth embodiment. In the stator 31, twelve divided pieces 89 having the same shape are arranged in an annular form. In the embodiment in the divided piece 89, a first end portion 89a is provided at the anterior end in the circumferential direction and a second end portion 89b is provided at the posterior end in the circumferential direction. The first end portion 89a has one convex portion in a rectangular shape and the second end portion 89b has one concave portion in a rectangular shape. The first end portion 89a and the second end portion 89b have complementary shapes. In the first end portion 89a and the second end portion 89b, the convex portion and the concave portion are provided in the positions apart from the side portion at the outer circumference side and the side portion at the inner circumference side of the first divided piece 89.

In the embodiment, the yoke 35 provided in the divided piece 89 has not arc shapes at both the outer circumference side and the inner circumference side, but linear shapes. Accordingly, the outer circumference and the inner circumference of the combined divided pieces 89 have substantially regular dodecagonal shapes. Note that the inner circumference guide 71 and the outer circumference guide 73 provided in the first case 26 may have circular shapes as shown in FIG. 3 or regular dodecagonal shapes conforming with the shapes of the stator 31. In the latter case, the attachment position of the divided piece 89 may be uniquely determined.

The first end portion 89a and the second end portion 89b having complementary shapes are combined, and thereby, the divided pieces 89 are not detached for a force applied in the outward direction or the inward direction along the radial direction R as is the cases with the other embodiments. Therefore, the assembly of the stator 31 may be easier and the stability of the form after the assembly may be improved. Further, the planar shape of the divided piece 89 is the linear shape and processing of the electrical steel sheets forming the yoke 35 may be easier. For example, when the stacking direction of the electrical steel sheets in the yoke 35 is the direction along the radial direction R like the core 51, plate-like members forming the yoke and the core may be formed by a single electrical steel sheet in the rotation axial direction as the planar direction. The divided piece 89 can be formed by stacking of electrical steel sheets having the shapes along the radial direction R. Note that, in this case, the convex portion and the concave portion may be formed by post-processing. The stator having the form may exert the same functions and effects as those of the other embodiments in efficient use and repair and replacement of the electrical steel sheets when damaged during manufacture.

Tenth Embodiment

Figure 14:
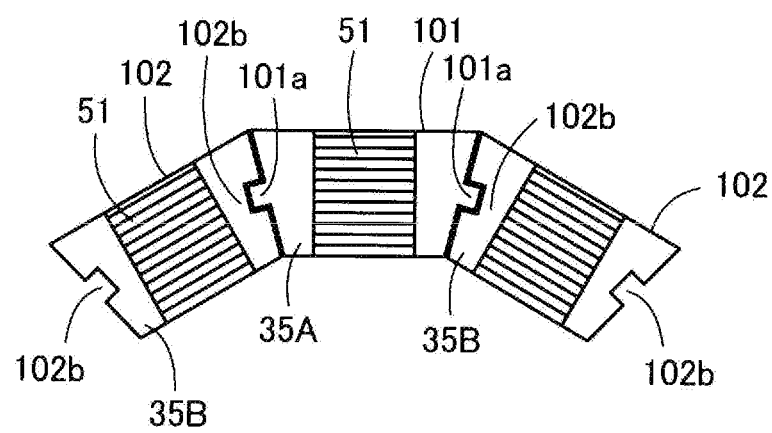
FIG. 14 is an explanatory diagram showing a combination of divided pieces of a tenth embodiment.

FIG. 14 shows a part of the stator 31 used for the axial gap motor 20 of the tenth embodiment. In the stator 31, six first divided pieces 101 and six second divided pieces 102 having different shapes are alternately arranged. In the embodiment, a yoke 35A of the first divided piece 101 and a yoke 35B of the second divided piece 102 have not arc shapes at both the outer circumference side and the inner circumference side, but linear shapes like those of the ninth embodiment. The first divided piece 101 and the second divided piece 102 have different shapes only in end portions, but have the same shape in the other portions. First end portions 101a at the anterior end in the circumferential direction and at the posterior end in the circumferential direction have convex portions projecting toward the outside in the circumferential direction of the first divided piece 101 and second end portions 102b at the anterior end in the circumferential direction and at the posterior end in the circumferential direction of the second divided piece 102 have convex portions recessed toward the inside in the circumferential direction. The first end portion 101a has one convex portion in a rectangular shape and the second portion 102b has one convex portion in a rectangular shape. The first end portion 101a and the second portion 102b have complementary shapes. In the first end portion 101a and the second portion 102b, the convex portion and the concave portion are provided in the positions apart from the side portions at the outer circumference side and the side portions at the inner circumference side of the first divided piece 101 and the second divided piece 102.

Like the tenth embodiment, when the shapes of the adjacent first divided piece 101 and second divided piece 102 are different, but the combined end portion shapes are complementary, as is the cases with the other embodiments, the advantage that the combined divided pieces are harder to be detached when a force in the direction along the radial direction R acts is obtained. Further, the other functions and effects may be similarly exerted.

Eleventh Embodiment

Figure 15:
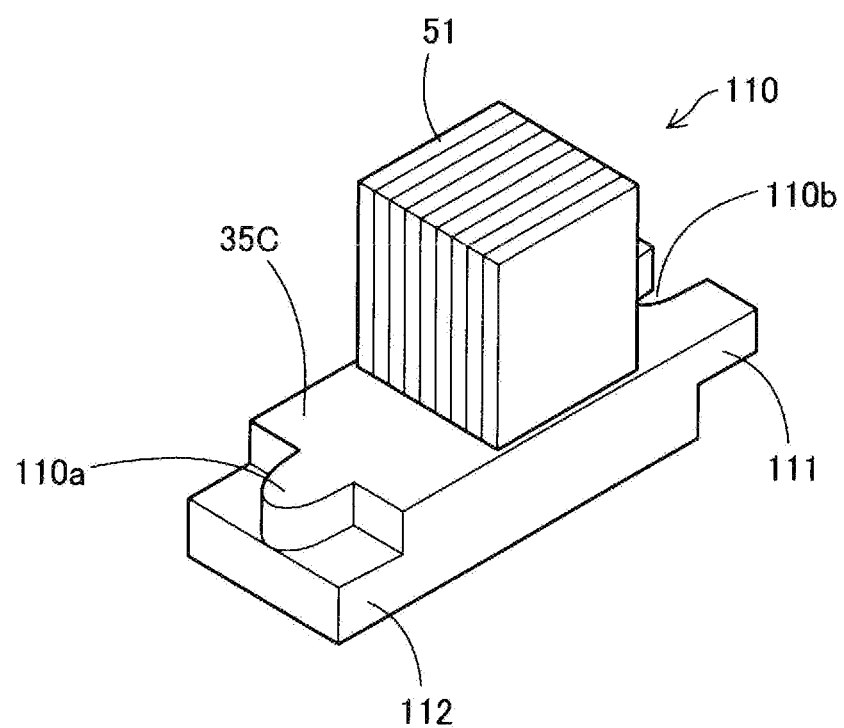
FIG. 15 is a perspective view exemplifying a shape of a divided piece of an eleventh embodiment.

FIG. 15 shows one of divided pieces 110 used for the axial gap motor 20 of the eleventh embodiment. The divided pieces 110 are arranged between the guides of the stator like those of the other embodiments and form the stator. The divided piece 110 has the core 51 at the center and a yoke 35C in the lower part of the core 51. As shown in the drawing, the yoke 35C has a two-step configuration along the rotation axial direction A and a first end portion 110a and a second end portion 110b have complementary shapes as is the cases with the other embodiments. In the divided piece 110, a convex portion projecting toward the outside in the circumferential direction and a corresponding concave portion recessed toward the inside in the circumferential direction are provided in the first end portion 110a and the second end portion 110b, and thereby, when a force in a direction along the radial direction R acts, the force to separate the combined divided pieces 110 may be resisted. Further, an upper step 111 as a second projecting portion and a lower step 112 as a first projecting portion are provided to project toward the outside in the circumferential direction in the first end portion 11 Oa and the second end portion 110b, and thereby, the lower step 112 contacts the upper step 111 in the rotation axial direction and the movement of the divided pieces 110 in the rotation axial direction may be restricted.

As described above, when the first end portion, the second end portion have the structures with two or more steps, the upper step and the lower step may have a reverse relationship. Further, as the complementary shapes, other shapes including the shapes of the convex portions, concave portions shown in the first to tenth embodiments may be employed. In the case of the structures with two or more steps, the convex portions and the concave portions can be shapes separated from the main bodies of the yokes 35C. That is, the convex portion can be stood from the lower step as a single columnar shape and the concave portion may be a bore shape corresponding to the sectional shape of the columnar shape.

Other Embodiments

As above, the several embodiments of the present disclosure are explained. In these embodiments, the number of divided pieces may be arbitrarily determined by the number of poles and the number of slots of the axial gap motor. Or, divided pieces having forms in combination of two, three, or more of the divided pieces of the above described embodiments may be used. In this case, the number of divided pieces is smaller than the number of cores. Or, the positions of division of the divided pieces are not limited to those with the cores substantially at the centers, but the end portions may have shapes closer to the cores. Obviously, the pieces may have shapes divided in the cores. In the above described embodiments, the direction of division is generally along the radial direction with respect to the rotation axis and the convex portions and the concave portions are formed with respect to the virtual line VL in the radial direction, however, the direction of division may be a direction crossing the radial direction. Or, the end portion of the divided piece may be formed in a two-step shapes of a portion projecting and a portion not projecting in the circumferential direction with respect to the virtual line VL (step shape in the plan view)

and a convex portion and a concave portion may be provided in one of the portions, and thereby, complementary shapes may be formed.

The cores 51 and the yokes 35 to 35C are formed by stacking of the electrical steel sheets and the stacking directions are arbitrary. For example, the stacking directions in the cores and the yokes may be the same or different. The stacking direction of the electrical steel sheets in the core may be the direction along the rotation axis A according to that in the yoke. Or, the stacking direction in the yoke may be the direction along the radial direction R or the direction along the circumferential direction according to that in the core. Obviously, the stacking directions may be the other directions.

For the cores and yokes, metal plates of magnetic materials such as electrical steel sheets are used, however, any other magnetic material e.g. pure iron, low-carbon steel such as S45C, Fe—Al alloy, martensitic or ferrite-containing stainless steel (e.g. SUS 440A) may be used. The materials for the cores and the yokes may be the same or different. Or, the cores and the yokes may be formed using the so-called powder compacting formed by compacting of magnetic powder with high pressure.

As described above, when the electrical steel sheets are stacked, the joint between the core and yoke may be performed using any method including deposition by surface coating, bonding, welding, half-caulking, fixing using knockout pins, and fixing using rivets or separate members. Similarly, the fixing of the divided pieces to the cases may be performed using any method including adhesives, welding (for the metallic cases), external pressure welding, and fixing using rivets or screws. When the guide parts 70 are used, the guide parts 70 may be separated from the cases, the divided pieces may be arranged in the annular forms in the cases, and the divided pieces may be fixed to the cases using the guide parts 70. In this regard, it is preferable that the guide parts 70 may be integrally formed from the inner circumference guide, the outer circumference guide, and connecting parts 75 connecting the guides. The connecting parts 75 may be provided to connect the inner circumference guide and the outer circumference guide in the locations corresponding to the contact portions of the first end portions and the second end portions of the divided pieces and the contact portions of the first, second end portions are covered by the connecting parts 75, and thereby, the divided pieces may be stably fixed.

The present disclosure is not limited to the above described embodiments, but may be realized in various configurations without departing from the scope thereof. For example, the technical features in the embodiments corresponding to the technical features of the respective aspects described in SUMMARY can be appropriately replaced or combined for solving part or all of the above described problems or achieving part or all of the above described effects. Unless the technical features are described as essential features in this specification, the technical features can be appropriately deleted.

What is claimed is:

1. An axial gap motor comprising:
a rotor rotating about a rotation axis; and
a stator placed apart in a direction of the axis with respect to the rotor, in which a plurality of divided pieces containing cores and yokes are combined in a circumferential direction of the rotation axis, wherein
the divided pieces include a first divided piece and a second divided piece in contact with the first divided piece,
a first end portion of the first divided piece in the circumferential direction has a convex portion projecting in the circumferential direction and a second end portion of the second divided piece in the circumferential direction has a concave portion fitted with the convex portion, and
the convex portion is provided in a position apart from a side portion of the first divided piece along the circumferential direction in a radial direction orthogonal to the rotation axis,
wherein the core and the yoke are integrally formed by stacking of plate-like magnetic materials in the axial direction,
in the yoke, a plurality of electrical steel sheets are stacked along a rotation axial direction, in the core, a plurality of electrical steel sheets are stacked along the radial direction,
one end portions of each of the first divided piece and the second divided piece in the circumferential direction are the first end portions and the other end portions are the second end portions,
the axial gap motor further comprises a case, an inner circumference guide and an outer circumference guide as guide members that hold and guide parts of the yokes of the divided pieces are provided in the case, wherein the fixing of the divided pieces to the case is achieved by using guide parts, the guide parts are separated from the case, the divided pieces is arranged in the annular forms in the case, and the divided pieces is fixed to the case by using the guide parts, the guide parts are integrally formed from the inner circumference guide and the outer circumference guide, and connecting parts are connecting the inner circumference guide and the outer circumference guide, and the connecting parts are provided to connect the inner circumference guide and the outer circumference guide in the locations corresponding to the contact portions of the first end portions and the second end portions of the divided pieces, and the contact portions of the first, second end portions are covered by the connecting parts.

2. The axial gap motor according to claim 1, wherein the first divided piece and the second divided piece have the same shape.

3. The axial gap motor according to claim 1, wherein the first divided piece and the second divided piece have different shapes, and
both end portions of the first divided piece in the circumferential direction are the first end portions and both end portions of the second divided piece in the circumferential direction are the second end portions.

4. The axial gap motor according to claim 1, wherein the convex portion has a length along the radial direction in a first position at an outside in the circumferential direction longer than a length along the radial direction in a second position at an inner side in the circumferential direction than the first position.

5. The axial gap motor according to claim 1, wherein the stator has a guide member projecting in the rotation axial direction and guiding the first divided piece and the second divided piece placed in the circumferential direction.

6. The axial gap motor according to claim 1, wherein at least one of the core and the yoke is formed by stacking of plate-like magnetic materials.

7. The axial gap motor according to claim 1, wherein the first end portion has a first projecting portion projecting in the circumferential direction, the second end portion has a second projecting portion projecting in the circumferential direction in a position different from that of the first projecting portion in the axial direction, and the first projecting portion contacts the second projecting portion in the axial direction.

\* \* \* \* \*